Oct. 27, 1964   W. A. SCOVILLE   3,153,959
SHOT DISPENSER, SPLITTER AND APPLICATOR
Filed Nov. 15, 1961   3 Sheets-Sheet 1
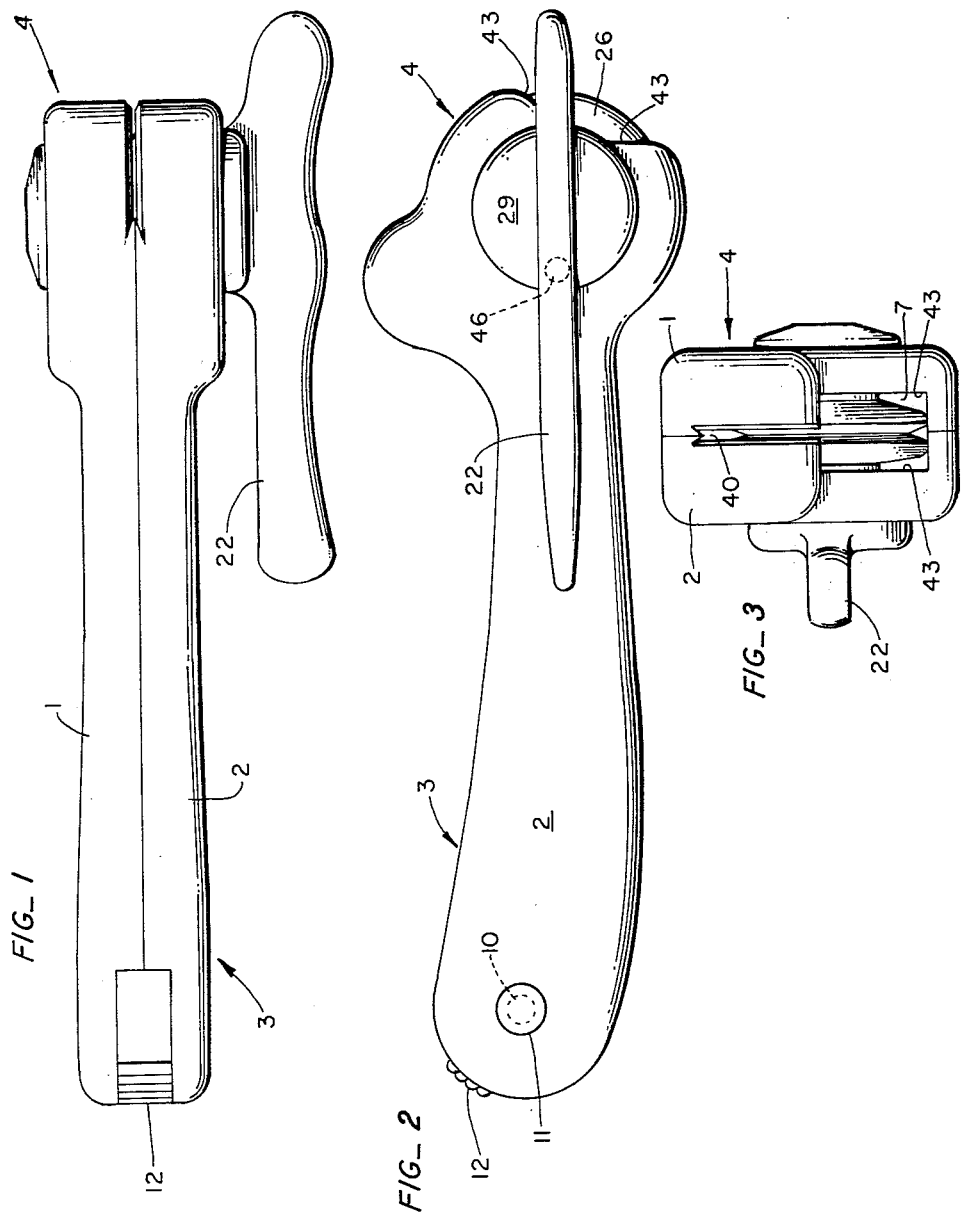
INVENTOR.
WRIGHT A. SCOVILLE
BY
Boyken, Mohler + Wood
ATTORNEYS Oct. 27, 1964 W. A. SCOVILLE 3,153,959
SHOT DISPENSER, SPLITTER AND APPLICATOR
Filed Nov. 15, 1961 3 Sheets-Sheet 2
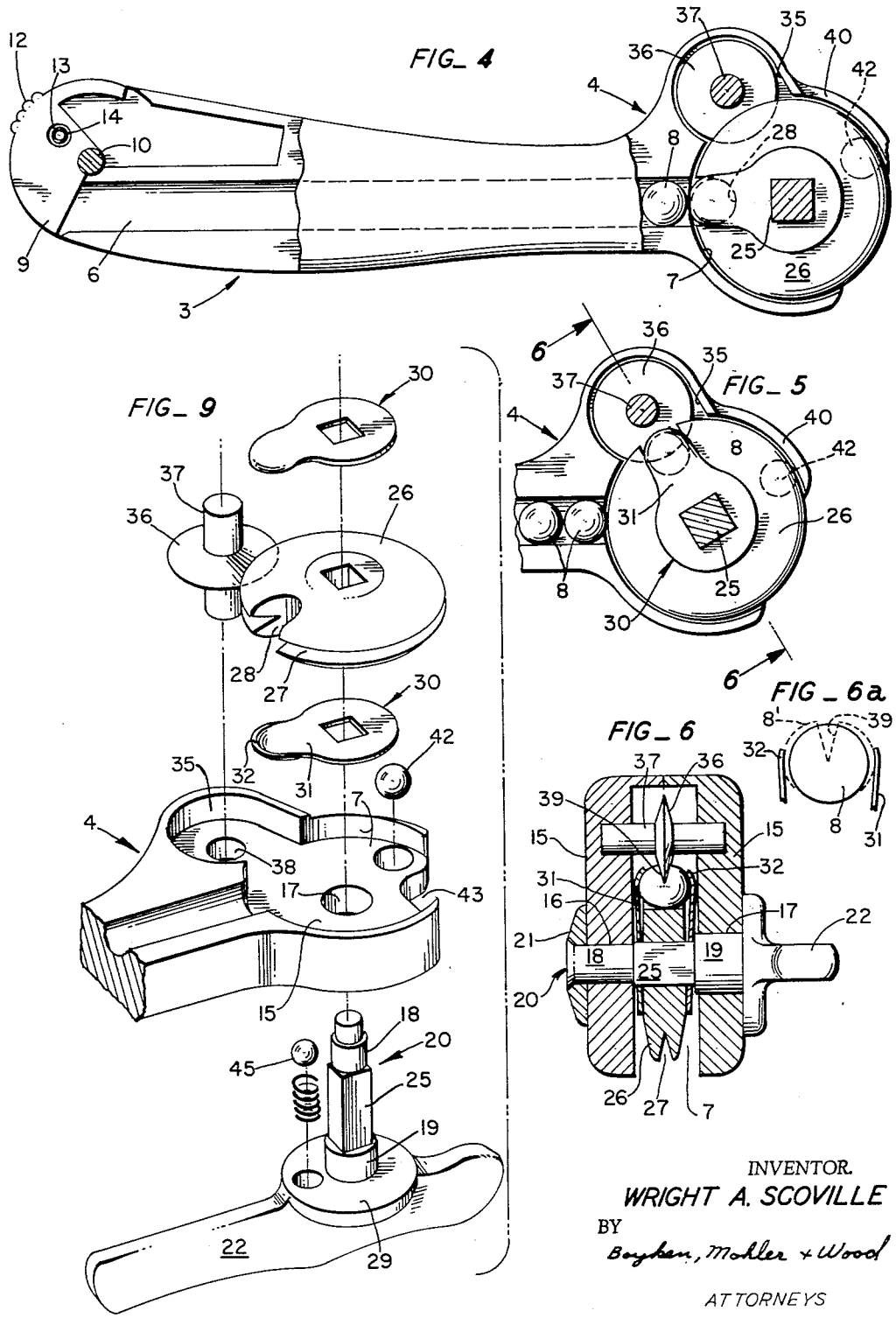
INVENTOR.
WRIGHT A. SCOVILLE
BY
Boyken, Mohler + Wood
ATTORNEYS Oct. 27, 1964 W. A. SCOVILLE 3,153,959
SHOT DISPENSER, SPLITTER AND APPLICATOR
Filed Nov. 15, 1961 3 Sheets-Sheet 3
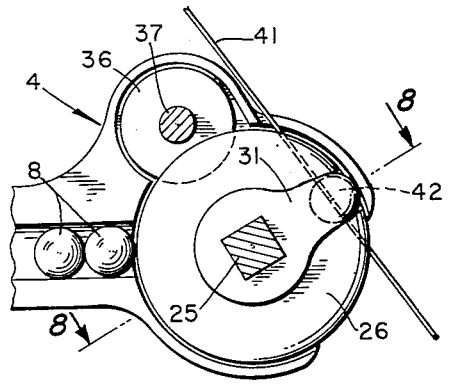
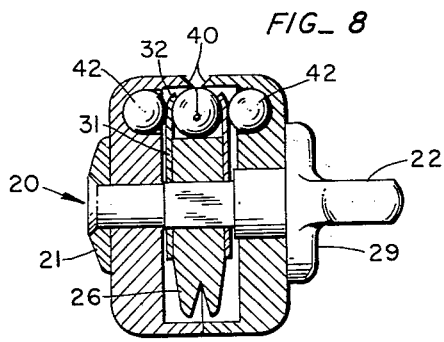
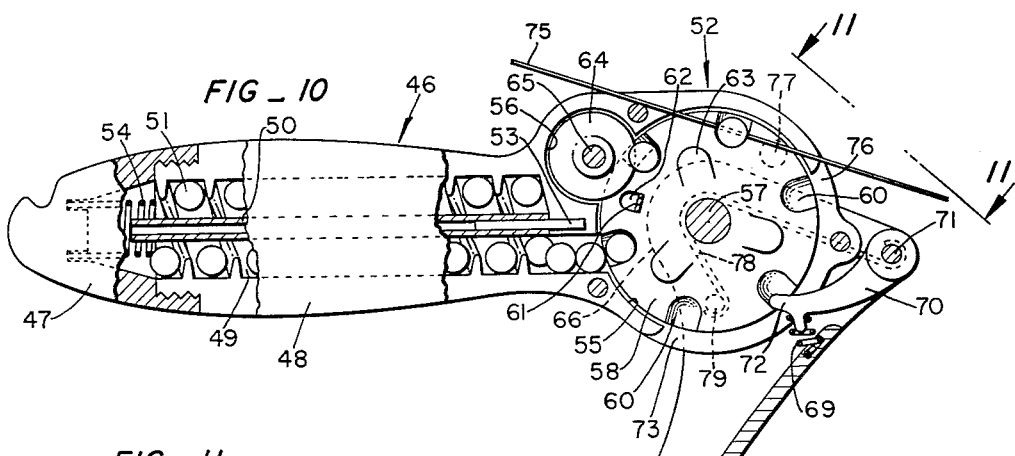
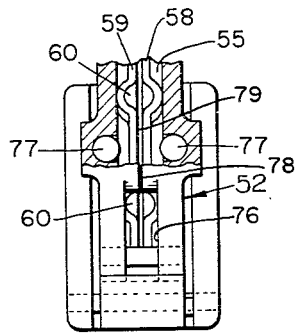
INVENTOR.
WRIGHT A. SCOVILLE
BY
Boyken, Mohler + Wood
ATTORNEYS United States Patent Office 3,153,959
Patented Oct. 27, 1964

3,153,959
SHOT DISPENSER, SPLITTER AND APPLICATOR
Wright A. Scoville, 20 S. Barnaberg, Medford, Oreg.
Filed Nov. 15, 1961, Ser. No. 152,583
4 Claims. (Cl. 81—15)

This invention relates to a device for dispensing lead shot, one at a time from a magazine, then splitting said shot and attaching it to a fishing line.

In fishing with a line, a fisherman frequently wishes to weight the line with lead shot, such as BB shot. Such shot may be purchased in partially split form in which the shot is split to approximately the center so that the fishing line may enter the shot through the relatively narrow V slit in the side that defines the partial split, after which the portions of the shot at opposite sides of the split are pinched together on the line that is in the slit. The shot is then tightly held on the line.

An object of this invention is to provide a simple, economically made, easily actuated, compact device that will hold a plurality of unsplit shot, and which device by a simple manual manipulation thereof will split said shot, in succession, and will carry it to a line positioning point where it will receive the line in the split and will then pinch the shot onto the line by closing the split with the line thereon.

Another object of the invention is the provision of a shot splitter and applicator in which a handle adapted to be manually held forms a magazine in which a supply of BB shot is adapted to be held, and which handle is provided with a head at one end having a rotary shot mover thereon and a line positioning means that is adapted to position a length of line in the path of the shot that is moved by the mover, and which mover is adapted to carry the shot past a splitter, where it is split and then past the line at the line positioning means so the line will enter the shot, and then on past a closing means that pinches the split shot closed on the line, and finally to a discharge opening where the shot that is now on the line, is discharged.

A still further object of the invention is the provision of a method of attaching shot onto a fishing line.

Other objects and advantages will appear in the description and in the drawings.

In the drawings:

FIG. 1 is a top plan view of a shot applicator illustrative of one form of the invention.

FIG. 2 is a side elevational view of the applicator of FIG. 1.

FIG. 3 is an end view of the shot applicator of FIG. 2 as seen from the right hand end.

FIG. 4 is a part elevational part sectional view of the applicator in which the head and handle are partially broken open to show internal structure.

FIG. 5 is a fragmentary part sectional view showing the head portion of FIG. 4 when the shot is in a shot splitting position.

FIG. 6 is a sectional view taken along line 6—6 of FIG. 5.

FIG. 6a is an enlarged fragmentary view illustrating the split shot when frictionally held upon being split.

FIG. 7 is a sectional view similar to that of FIG. 5 showing the fishing line in a position extending through the split in the shot and with the shot mover in a position in which the shot is punched onto the line.

FIG. 8 is a cross sectional view taken along line 8—8 of FIG. 7.

FIG. 9 is an exploded view showing one-half of the head of the device and most of the elements that are held in the head.

FIG. 10 is a part sectional part elevational view of a modification of the form of applicator shown in the previous views, one of the shot holding discs in the large cylindrical head at the right hand end of the view being removed to show the shot therein in elevation.

FIG. 11 is a view of a portion of the head of the device of FIG. 10 as seen from line 11—11 of FIG. 10, but with part of the head being broken away and in cross section to show the interior structure.

Referring to FIGS. 1, 2 and 3 in detail, the applicator comprises a body that is in the form of a pair of substantially elongated halves 1, 2 that are of corresponding structure, being secured together in opposed relation, and having complementarily formed oppositely opening recesses in their adjacent sides.

Considering the body as a unit, when secured together, one end of said body is a handle portion 3 while the opposite end portion comprises a head 4.

The handle and head are exteriorly streamlined so as to eliminate any objectionable sharp corners that would cause objectionable wear on the pockets of clothing in which the device may be carried.

As above stated, the oppositely facing sides of the body halves are similarly recessed and within the handle, two opposedly opening recesses form the walls of a passageway 6 (FIG. 4) that extends longitudinally of the handle from the outer end of the handle that is opposite to the head 4 while the other end of the passageway opens into one of the cylindrical sides of a generally cylindrically sided chamber 7 that is formed by the opposed recesses in said head (FIGS. 3, 9).

This passageway forms a magazine for a row of shot 8 that may fill said passageway from the outer end of the handle to the head.

A segmentally formed gate 9 pivotally carried on the handle by projecting pivots 10 that not only function to rotatably support the gate but to also hold the handle halves together, since the pivots rotatably extend through the halves of the handle and are formed with heads 11 (FIG. 2) at their ends extending over the outer sides of the halves. Thumb or finger engaging ridges 12 on the gate are exposed at the outer end of the handle for rotating the gate clockwise, as seen in FIG. 4, to pivot the gate to a position uncovering the outer end of passageway 6 to enable filling the passageway with shot. Any desired or suitable means may be provided by yieldably or frictionally holding the gate closed, such as a coil spring 13 positioned in an opening 14 extending through gate 9 eccentric to pivot 10 and reacting between balls adapted to seat in coacted detent recesses formed in the sides of the handle halves. This in itself is conventional detent construction. Thus the gate will be yieldably held in closed position until the gate is forcibly revolved to open the latter, and the detent will frictionally hold the gate open during the filling operation until the gate is moved counterclockwise to closed position, where the gate will be releasably and yieldably held in closed position by the detents.

The head 4 as already stated has a cylindrically sided chamber 7 that is formed by the opposedly opening recesses in the halves 1, 2, and which chamber has opposed endwalls 15 (FIG. 6) formed with coaxial openings 16, 17 through which rotatably extend the cylindrical ends 18, 19 of a central shaft generally designated 20. End 18 of shaft 20 projects outwardly of one endwall 15 and through a circular retainer disc or washer 21 and is swaged over the washer around the central opening in the latter to hold the washer against the outer side of endwall 15 adjacent thereto and to prevent the shaft 20 from withdrawal.

The other end 19 of shaft 20 has an arm 22 integral therewith, which arm is adapted to be rotated by the fingers of the hand for rotating the shaft, and said arm 22, as seen in FIG. 1, extends different distances to opposite sides of the shaft 20 and longitudinally of the main body of the device, with the longest portion of the arm alongside handle 1 when the recess 28 is opposite to the passageway 6.

The intermediate portion 25 of shaft 20 that is between the endwalls 15 is square, and extends through the square central opening in a circular disc 26 so that the disc will be firm on shaft 20 and will rotate with the latter.

This disc 26 has an outwardly opening annular V-shaped recess 27 in its outer periphery, and also the outer periphery of the disc is broken at one point therearound by an outwardly opening generally U-shaped recess 28.

The passageway 6 extends radially outwardly of the disc 26 in the plane of the latter and said recess 28 will scan the open end of the passageway 6 where the latter opens into chamber 7, upon rotation of disc 26. Said recess 28 is adapted to receive a shot 8 therein from passageway 6 when the recess 28 is opposite to the open end of the passageway 6. The shot will readily drop into recess 28 by gravity if the handle 3 is inclined so that the head 4 is lowered.

At opposite sides of disc 26 and also mounted on the square portion 25 of shaft 20, are a pair of shot holders 30 that may be stamped from resilient sheet metal. These shot holders are alike, having arms 31 in opposed relation extending radially outwardly from the inner ends that are on shaft 20. The outer ends 32 of the shot holders are slightly curved toward each other so as to extend slightly around the shot 8 when in engagement with the latter.

The outer end portions of said arms 31, or shot holders, extend over the lateral open sides of the recess 28 in disc 26, and the outer marginal portion of the disc itself is progressively thinner in a direction radially outwardly of the disc so that the outer end portions of arms 31 will not contact the disc.

The outer ends of arms 31, before a shot drops into the recess, are spaced so as not to interfere with the shot readily falling into the recess 28 from the passageway 6. FIG. 6a shows, in full line, the spacing between the outer ends of arms 31, and the position of a shot 8 between said arms, before the shot is split.

Head 4 is also formed with a smaller cylindrical ended recess or cutter chamber 35 (FIGS. 4, 9) one cylindrical side of which opens into one side of the chamber 7 in which disc 26 is positioned.

The chamber 35 opens into a side of chamber 7 at a point spaced above the point where passageway 6 opens into the chamber 7. This chamber 35 has an annular cutter wheel 36 centrally supported therein on a shaft 37 that is rotatably supported at its ends in bearings 38 (FIG. 9) that are formed in the endwalls of chamber 35, which endwalls are in continuation of endwalls 15.

The sharp outer edge of the cutter 36 extends into the annular outwardly opening recess 27 in disc 26, and the cutter is appreciably wedge shaped in cross sectional contour radially thereof.

From the foregoing it will be seen that upon rotating the arm 22 clockwise as seen in FIG. 4, when a shot 8 is in recess 28, said shot will be carried past the cutter wheel 36 and will be split by the latter to form a wedge shaped outwardly opening recess 39 (FIG. 6) in a side of the shot, and the opposite sides of the split will be forced apart by the wheel 36 to a substantial degree, as indicated in dotted lines at 8' in FIG. 6a. When the shot is so spread, the outer sides will be forced into yieldable engagement with the opposed sides of the outer ends of arms 31 as seen in FIG. 6a and from that point on, as long as this yieldable engagement continues, the shot will be held against rotation relative to the arms as the disc 26 and arms 31 are revolved clockwise.

From a point slightly beyond the cutter 36 in a clockwise direction as seen in FIG. 4, the cylindrical upper wall of the disc chamber 7 is formed with a slit opening 40 (FIGS. 3, 4) that extends circumferentially around the said upper wall for a distance.

This slit enables the fishing line 41 to be positioned in the slit and to extend into the V-shaped recess 39 in the upper side of a shot that is carried below the slit in a clockwise direction when the disc 26 is rotated in such direction.

Adjacent to the right hand end of the slit 40, and spaced from the point where the slit commences at the cutter housing 35, a pair of steel balls 42 are rotatably supported in substantially complementarily formed opposedly opening recesses in the halves of head 4.

As the shot 8, that has been split, is moved past the balls 42, they will engage the oppositely outwardly sides of the outer ends of the holders 30 and will squeeze or pinch together the spread portions of the shot 8 at opposite sides of the split 39 in the upper side of the shot 8, thus securely holding the shot onto the line.

It is pertinent to note that when this occurs, the degree of compression on the balls is such as not to cause injury to the line 41, hence the spacing of the balls and other factors that affect the degree of compression desired, will be adjusted to insure against such injury, and the degree of compression is also such that the arms 31 will spring apart as soon as the holders pass the balls 42, so that the shot will be released for falling from the device.

An opening 43 is formed in the cylindrical wall of the chamber 7 (FIG. 3) just beyond the balls 42 through which the shot 8 is free to be discharged from within head 4 as soon as the shot is carried to said opening.

Insofar as the method is concerned, it is seen that the shot to be applied to a fishing line is supported for movement in one direction along a circular path of travel from an entry point to said path to a discharge point spaced therefrom. The shot is radially substantially halved to approximately the center along a line bisecting the shot to form an outwardly opening wedge like recess in one side in the plane of said circular path during said movement of said shot from said entry point to said discharge point, and after said halving and while said shot is moving in said path, the shot is carried to a section of the fishing line that is in said plane so that said section is within said outwardly opening recess, and said halves are then closed on said line while said shot is still moving in said path, and thereafter the shot and said section are moved together in said path to said discharge point where the shot is discharged from the path outwardly of the latter relative to its central axis.

The operation of the device illustrated enables the accomplishment of the above method. In FIG. 2 the device is in the starting position and a ball detent 45 (FIG. 9) carried by the arm 22 is adapted to be yieldably urged into a shallow complementary recess 46 (FIG. 2) found in the outer flat face of the head 4 that is adjacent to arm 22, which arm has a circular disc like enlargement 29 that extends over said flat face. This detent yieldably holds the arm 22 in the starting position alongside the device and extending longitudinally of the latter.

The head 4 is held downwardly, and a shot 8 rolls into recess 28 in disc 26. The operator then rotates the disc 26 clockwise as seen in FIGS. 4, 5 and the shot is carried past the splitter or cutter wheel 36.

A line 41 is positioned in slit 40, as seen in FIG. 7 and the rotation of arm 22 is continued so the shot 8, while held against rotation relative to the holders 30, will be carried to the line, then pinched onto the line (FIGS. 7, 8) and thereafter discharged from the head 4.

FIGS. 10, 11 show a modified form of the invention in which the body 46 of the device is in halves, except for the outer end portion 47 of the handle 48 that is in the form of a cap screw threaded onto the halves of the outer end of the handle to close one end of a spiral passageway 49 formed by recesses on the opposed sides of the handle halves about a central tubular member 50 that is coaxial with the handle and forms an inner race for a spiral row of shot 51 that is in said spiral passageway.

One end of tubular member 50 is supported in the head portion 52 by a pin 53 secured to said member and secured in a complementary recess in said head portion.

An expansion coil spring 54 around the tubular member 50 reacts between the last of the shot 51 in the row that is around said tubular member, and cap 47 to yieldably urge the balls of the row toward head portion 52.

The head 52 is formed with a cylindrical sided chamber 55 that is substantially like chamber 7, and a cutter chamber 56 in the head alongside the chamber 55 substantially the same as in FIG. 4 except that the cutter chamber is slightly smaller. One side of chamber 56 opens into the chamber 55, and the inner end of the shot passageway 49 opens into the side of chamber 55 below the cutter chamber 56.

A shaft 57 extends through the center of the chamber 55, on which is a pair of similar opposed shot carrying discs 58, 59 supported for rotation.

These discs are formed in their outer marginal portions with complementarily formed oppositely opening recesses providing pockets 60 into which shot from the end of passageway 49 are adapted to be yieldably urged as the discs are rotated. In FIG. 10 the disc 59 indicated in FIG. 9 is removed, so the laterally open sides of the pockets 60 in disc 58 are seen.

An ear 61 on one disc extends through an opening 62 in the adjacent disc (FIG. 10) to insure rotation of the discs as a unit, and these discs are resilient and are formed with leaf springs 63 that extend toward each other into yieldable engagement to yieldably hold the pockets apart for freely recovering the shot at the end of passageway 49 but that permit closing on the shot as the marginal portions of the discs are forced toward each other.

A shot cutting wheel 64 is rotatably supported in the cutter chamber 56 on a shaft 65 in the same manner as cutter wheel 36, and its wedge like outer peripheral marginal portion along the cutting edge extends between the outer marginal portions of the discs 58, 59.

In this manner, a shot in each pocket 60, when carried past the cutter, will be split in exactly the same manner as already described with respect to the device of FIGS. 1–9.

Supported on the ends of shaft 57 that project oppositely outwardly of the sides of head 52 are the ends of a pair of arms 66 that extend from one end of an arm 67 that, in turn, extends over the outer cylindrical sides of head 52 and that is adapted to project from said head to the outer end of handle 48, and to be swung on shaft 57, or about the axis thereof, to a position alongside handle 48 where it may be releasably secured by a bail 68 on the outer end of said arm 67. Bail 68 is adapted to swing over the outer end of handle 48 to secure it in said position when the device is not being used, and a leaf spring 78 reacting around shaft 57 and secured at its ends to pins 71 and 79 tends to yieldably swing the bail carrying end of arm 67 outwardly away from the handle 48 at all times.

Pawl 70 is elongated and one end thereof is pivotally connected to handle 67 at pivot 71, and said pawl extends from said pivot in a direction generally toward the bail carrying end of handle 67. The end of the pawl opposite to pivot 71 is formed with a tooth 72 that is adapted to extend through a slot 73 in the cylindrical wall of chamber 55 and into a shot pocket 60 formed by the discs 58, 59. An expansion spring 69 reacting between arm 67 and pawl 70 continually forces said pawl into engagement with discs 58, 59 or a pocket 60 thereof. Thus the pawl 70 and the pockets provide a ratchet action in which each oscillation of the handle 67 will move the two discs clockwise a distance equal to the distance between each adjacent pair of pockets 60.

The distance between pockets is such that one movement of the handle 67 to the handle 48 from the position shown in FIG. 10 will advance a shot in the pocket at the end of passageway 49 past the cutter wheel. The next stroke of the handle would carry the shot to the line receiving position, and the next would carry the shot past the shot squeezing position to the discharge position where it would be discharged.

As seen in FIG. 10, a fishing line, indicated at 75 is in the wedge shaped split in a shot at the line receiving position mentioned above. This is much the same as in FIG. 4.

A discharge opening 76 is formed in the cylindrical side of the chamber 55 (FIG. 11) and between said discharge opening and the line receiving position of the shot are a pair of opposed, steel balls 77 that perform the function of squeezing together the sides of the shot opposite to the split therein to secure the shot onto the line. These balls are best shown in FIG. 11 and are substantially the same as the balls illustrated in FIG. 8.

The balls 77 engage the outer sides of pockets 60 to squeeze the halves together, and the discs 58, 59 being yieldable react in substantially the same manner as the shot holder means 30 of FIG. 4. When the shot is split, the shot will be in frictional engagement with the sides of the pocket in the same manner as described for FIG. 6a, so the shot will not be free to roll in the pockets, while the shot will be free to be discharged from the pockets at the discharge point, even if a slight pull on the line would be required.

It should be noted as an important feature of this invention that the slot in head 52 through which the line 75 extends, and which slot extends to the opening 76 (FIG. 11) is narrower than the gap maintained between discs 58, 59 and is also narrower than the cut formed in the shot by cutting wheel 64. This insures proper alignment of the leader in the cut formed in shot 51 (FIG. 10). This same relation exists between slot 40, V-shaped recess 27 in disc 26, and split 39 of shot 8 in the form of this invention illustrated in FIGS. 1–9.

The invention is not to be limited by the exact embodiments of the device shown, which are merely by way of illustration and not limitation, as various other forms of the device will, of course, be apparent to those skilled in the art without departing from the spirit of the invention or the scope of the claims.

I claim:
1. In combination with a body having therein:
  (a) a magazine adapted to hold a plurality of lead shot to be split;
  (b) a shot splitter adapted to form a split in one side of a shot carried therepast;
  (c) line positioning means in general alignment with said shot splitter for positioning a length of fishing line in the path of the split side of a shot split by said splitter upon such split shot being carried to said line positioning means;
  (d) a shot squeezing means adjacent to said line positioning means adapted to squeeze the split sides of said shot against said fishing line upon movement of said shot to said shot squeezing means;
  (e) a shot discharge opening formed in one side of said body adjacent to said shot squeezing means through which shot squeezed onto said line is adapted to be discharged;
  (f) a shot carrier for supporting said shot for movement from said magazine to and past said shot splitter, line positioning means, shot squeezing means and said shot discharge opening, in succession upon movement of said carrier in said one direction;
  (g) a feed opening formed in said magazine for feeding a shot to said carrier as the latter is moved therepast;
  (h) means supporting said carrier for said movement;
  (i) manually actuatable means outside said body connected with said carrier for moving the latter;

(j) said shot carrier including a pair of opposed spring elements having opposed shot engaging end portions at one of their ends and connected at their opposite ends for rotation of said shot engaging portions in a circular path past said shot splitter, line positioning means, and shot squeezer with a shot between said end portions;

(k) said shot splitter being supported for projecting between said end portions upon the latter being moved therepast;

(l) the spacing between said end portions being such that the outer sides of said shot at opposite sides of the split formed by said splitter will be moved into frictional engagement with said end portions by the splitting operation of said splitter;

(m) said end portions being free from frictional engagement with an unsplit shot therebetween whereby shot from said magazine may be freely deposited between said end portions at said feed opening.

2. A shot splitter comprising:

(a) a body;

(b) a substantially circular, disc-like shot carrier;

(c) carrier supporting means supporting said carrier within said body for rotation in one direction about the axis of said carrier;

(d) carrier actuating means carried by said body in engagement with said carrier for rotating said carrier in said one direction;

(e) an inlet and an outlet formed in said housing around the outer periphery of said carrier respectively for passage of shot to said carrier and for discharge of said shot therefrom at said spaced points;

(f) a radially outwardly opening recess formed in said carrier movable past said inlet and said outlet and in communication therewith upon said rotation of said carrier in said one direction for receiving a shot at and from said inlet and for carrying such shot in a circular path to said outlet for discharge from the latter upon said rotation of said carrier;

(g) a shot splitter carried by said body between said inlet and said outlet and splitter supporting means supporting said splitter on said body projecting into said circular path for partially splitting and for spreading such shot laterally relative to said carrier upon the latter being carried in said recess from said inlet to said outlet;

(h) said carrier including spaced opposed yieldable means rotatable therewith about said axis spaced apart a sufficient distance for entry of such shot into said recess at said inlet free from frictional resistance by said yieldable means and for frictionally engaging and yieldably holding such shot against rotation about its axis upon the latter being partially split and spread by said splitter, whereby the split side of said shot will be held in a predetermined position by said yieldable means after leaving said splitter for receiving a line in the split in said shot;

(i) line positioning means on said body between said shot splitter and said outlet for positioning a fishing line in the split in the shot formed by said shot splitter;

(j) shot squeezing means carried by said body between said line positioning means and said outlet engageable with said yieldable means for urging the latter toward each other against the tension of said yieldable means for squeezing said shot for closing the spread split side on said line upon said recess and said yieldable means being moved in said one direction past said shot squeezing means.

3. In a shot splitter as defined in claim 2:

(k) said shot squeezing means being a pair of metal balls at opposite sides of said path, and recesses formed in said body supporting said balls for said free rotation thereon and in positions projecting into said path for said engagement with said yieldable means;

(l) said yieldable means being automatically movable under the influence of the yieldable tension thereof to free a shot for freely passing out of said outlet after said yieldable means passes from between said pair of balls.

4. In a shot splitter as defined in claim 2:

(k) said line positioning means comprising a slot formed in said housing between said shot splitter and said outlet and disposed in the plane of said carrier and communicating with the space between said yieldable means for passage therethrough into the split in a side of such shot when the latter is held by and between said yieldable means, the width of said slot being less than said space between said yieldable means when the latter are squeezed toward each other by said shot squeezing means.

References Cited in the file of this patent

UNITED STATES PATENTS

| | | |
|---|---|---|
| 2,603,992 | Brown | July 22, 1952 |
| 2,723,403 | Miller | Nov. 15, 1955 |
| 2,803,977 | Surratt | Aug. 27, 1957 |
| 2,806,229 | Pletz | Sept. 17, 1957 |
| 3,003,376 | Macy et al. | Oct. 10, 1961 |
| 3,094,717 | Gabbert | June 25, 1963 |